United States Patent Office 2,908,597
Patented Oct. 13, 1959

2,908,597
TREATMENT OF STARCHES AND GUMS, AND COMPOSITIONS THEREOF

William L. Owen, Baton Rouge, La.

No Drawing. Application June 6, 1957
Serial No. 663,865

12 Claims. (Cl. 127—71)

This invention relates to the treatment of starches and gums for use in oil well drilling fluids, and more particularly to the production of starches and gums which are immune to microbiological degradation, and to employment of the starches and gums so treated in drilling muds.

Most of the wells now drilled in search of oil and gas are drilled by the rotary method, in which a fluid known as a drilling mud or drilling fluid, is circulated to the bottom of the hole through a hollow drill pipe, where it emerges through ports in the bit and rises in the cylinder of annular cross section formed between the drill pipe and the casing or the walls of the hole being drilled. The fluid remains in the hole during drilling, and serves to counterbalance the pressure of oil, gas, salt water and the like, in formations penetrated, as well as to cool and lubricate the bit and to remove cuttings to the surface. The technology of such drilling fluids is a rapidly expanding art and science, and much of the effort expended in improving drilling fluids or drilling muds is directed toward making them difficult to filter. This is for the reason that filtration normally tends to take place against exposed formations, with the building up of a filter cake on the walls of the hole and the contamination of the formations by filtrate from the mud. These effects lead to stuck drill pipe, unconsolidation of formations, impairment of oil productivity of the sands, and other major disadvantages. Some years ago the addition of bentonite to drilling muds was found to bring about a considerable improvement in mud infiltrability but the increasing depths to which wells are drilled, the difficult formations now penetrated which in earlier years would have been passed up, and the increasing cost of drilling operations has made it necessary to employ hydrophilic colloids having the property of reducing mud filtrability even more than is possible with bentonite and other selected clays. The cheapest of these newer colloids is starch, used in its gelatinized form, and indeed generally pregelatinized by cooking in water and drying before being transported to the field for use. The water dispersible gums have been used to some extent as well. So-called synthetic gums such as sodium carboxymethylcellulose and hydrolyzed sodium polyacrylonitrile are also widely used. All of these starches and gums have a particular advantage over clays in that their ability to reduce mud filtration is in general not adversely affected by the presence of salt.

Now in the case of starches and the naturally occurring plant gums, and the latter is what is to be understood hereinafter as "gums," a considerable difficulty arises from the tendency of these materials to undergo fermentation and other forms of microbiological degradation when in use. There are several techniques for avoiding such degradation, but all are relatively costly and involve constant supervision of the mud during use. For example, the mud may be maintained saturated in salt, although in this event saturation must be maintained as distinguished from only partial saturation. Drilling muds containing starch or gums, for example, may undergo fermentation even though they are two-thirds saturated with sodium chloride. Where sufficient salt is not contributed by formations penetrated or where it is desired to avoid dissolution of salt formations, it is necessary to purchase salt and add it to the mud where this method of preservation is employed. Another means of preserving muds containing starches and gums is by maintaining a pH in excess of about 11½. This involves chemical treatment which can be both expensive and time-consuming. Finally, such muds can be preserved with chemicals such as formaldehyde, which again must be added to the mud and maintained at not less than a particular concentration. A disadvantage common to all of the above-described preservation techniques is that the entire amount of mud must be fully treated with the preserving means whether salt, caustic soda, or formaldehyde or the like, whether a small or a large amount of a starch or gum is used. This makes it uneconomical to use starches or gums in relatively low concentrations, in order to obtain only a portion of the benefits possible, because the cost of preserving the mud remains about the same.

An object of the present invention is to provide a method of treating starches and gums so that the treated material itself is immune to fermentation or like degradation.

Another object of the invention is to provide improved drilling muds containing starches and gums and immune to fermentation.

Other objects of the invention will appear as the description of the invention proceeds.

In accordance with an illustrative embodiment of the invention, a starch or gum is treated with a chlorinated dicyclic phenol of a type to be described, in such a fashion that the starch or gum is intimately coated and/or admixed with the phenol in an extremely fine state of subdivision, and so that the phenol becomes substantially adsorbed on the starch or gum. The starch or gum is subsequently used in the preparation and treatment of aqueous drilling fluids.

Coming first to the starch or gum, the starch may be either a relatively pure starch like corn starch, potato starch, rice starch, and the like, or a starchy flour such as corn flour, potato flour, rice flour, wheat flour, arrowroot flour, and so forth. As is well known, starches and flours in their natural state do not swell in cold water. It is necessary to gelatinize them before they behave as swellable, water dispersible, hydrophilic colloids. With no exception known to me, all of the starches and flours currently used in drilling muds have been cooked with water so as to be gelatinized and thereafter dried, all of this being done at a plant remote from the ultimate point of use. After a starch or flour has been so cooked and dried, it will then redisperse in water or drilling mud even though in the cold. Additionally, most if not all of the starches and flours currently used in the United States at least, have been given a chemical treatment so as to reduce the viscosity finally achieved by the dispersion of the gelatinized material in the mud. Treatments of this type are described in United States Patent No. 2,417,307.

Quite comparable to gelatinized starches and starchy flours are the naturally occurring water soluble gums, which include as typical members, gum karaya, gum tragacanth, gum arabic, guar gum, locust bean gum, seaweed gums including Irish moss and alginates, dextran (a gum elaborated by certain strains of chain-forming cocci, genus Leuconostoc, on sucrose). All of these gums form a well-known and well-recognized class, and as has been mentioned, will be referred to herein as simply "gums."

The chlorinated dicyclic phenol is a chlorohydroxydiphenyl, -diphenylmethane, or -diphenylethane. The chlorine atom may be on either of the two benzene rings, and likewise the hydroxy group may be on either of the two benzene rings, so that the compound is a phenol. These compounds have a structure as shown in the following, in which it will be understood that any one compound has no more and no less than one chlorine atom and one hydroxy group:

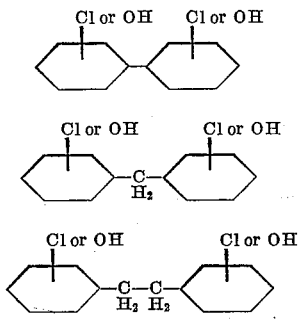

These compounds may also be described as the following:

$x$-Chloro, $y$-hydroxy diphenyl,
   $x$-Chloro, $y$-hydroxy diphenylmethane, or
   $x$-Chloro, $y$-hydroxy $\alpha,\beta$-diphenylethane where $x$ and $y$ may be 2-6 inclusive, or 2'-6' inclusive, with $y$ not equal to $x$.

Again, it will be evident that these compounds have the formula $C_{12}H_9OCl(CH_2)_n$, where $n$ is 0, 1, or 2.

The commonest species of the group described and one which is available commercially at relatively low cost is 5-chloro 2-hydroxydiphenylmethane. This may of course also be described as orthobenzylparachlorophenol, and is available from the Monsanto Chemical Company as Santophen-1. Other species will be referred to in some of the examples which follow.

All of these compounds as have been just described have the characteristic of extremely low solubility in water, considerable solubility in polar and aromatic organic solvents, and generally poor solubility in non-polar aliphatic solvents, such as kerosene and petroleum ether. They are all solids with moderate melting points roughly approximately covering the range of about 40° C. to 150° C., depending upon the particular positions occupied by the chlorine and hydroxy group. All of these compounds are germicides. Moreover when placed in intimate contact with a starch or a gum, in the fashion to be described, they appear to become firmly attached to the latter, even when the starch or gum so treated is dispersed in a great excess of water or other aqueous liquid and agitated as is the case when starches and gums are employed in drilling muds.

In accordance with my invention, I obtain an intimate admixing of a phenol of the type described, or indeed of a mixture of several species of the group, with the starch or gum. I have found two methods of obtaining an admixture so as to place the phenol in an extremely fine state of subdivision, and as stated, substantially adsorbed onto the starch or gum. The first method consists in dissolving the chlorinated phenol in a solvent for the latter, and then wetting and indeed soaking the starch or gum in the solution thus formed. No lumping problems are encountered when this method is used, because the solvents which are able to dissolve the chlorinated phenol are, from their very chemical nature, not sufficiently hydrophilic to cause the starch or gum to swell. I allow the starch or gum to remain in contact with the solution of the phenol for a short period of time. Particularly if the former is finely divided, such as starches and gums ground to pass 30-mesh, for example, the time of contact need be only a minute or so. The starch or gum is then freed of solvent by the evaporation of the latter. The chlorinated phenols, as stated, being relatively non-volatile, remain behind in place in an association with the starch or gum so intimate that it may be described as adsorption, and indeed in some cases a loose chemical combination appears to take place, although it is to be understood that I do not wish to be bound by any theory of operation. In general, it will be economical to recover the solvent by any of the well-known solvent recovery methods, so that it may be re-used in treating additional starch or gums. The best solvent that I have found for all-round use is isopropyl alcohol, since it has good solvent properties for the various chlorinated phenols which I employ, it is cheap, widely available commercially, non-toxic, relatively non-explosive, not so volatile that solvent losses are high, and readily recoverable by standard methods. However, other solvents may be used, as long as they are able to dissolve the chlorinated phenol. Such additional solvents are the other aliphatic alcohols, such as ethyl alcohol, methyl alcohol, normal propyl alcohol, butyl alcohol, and the like; ethers, such as ethyl ether; ketones, such as acetone, and methyl acetone; esters, such as methyl acetate, ethyl acetate, amyl acetate, ethyl formate, and the like; various oxygenated compounds, such as diacetone alcohol, ethylene glycol, "Cellosolve" (2-ethoxyethanol), and "Cellosolve" acetate (2-ethoxyethylacetate); chlorinated solvents, such as carbon tetrachloride, perchloroethylene, trichloroethylene, methylene chloride, and the like; aromatic hydrocarbons, such as benzene, xylene, and toluene; and even aliphatic hydrocarbons, such as naphtha, petroleum ether, kerosene, and the like. As mentioned, the aliphatic hydrocarbons in general do not have great solvent power for the chlorinated phenols which I employ, so that a relatively high dilution ratio must be used, which is to some extent compensated for by their cheapness. Where a solvent recovery process is used, it is better to use a readily volatile solvent like isopropyl alcohol instead of a high-boiling material like ethylene glycol, although the latter will indeed work with a suitably engineered solvent recovery system.

Where starch is treated by the solvent method described, it will generally be treated subsequent to gelatinization. If an attempt is made to treat the starch before it is gelatinized, the solvent does not readily penetrate the unswollen starch granule, although this method can still be used if the drying temperature used in the gelatinizing process is above the melting point of the phenol used, since the chlorinated phenol will stay with the starch during subsequent cooking and drying, so that when a pregelatinized starch is finally made, the chlorinated phenol will be found in the proper state of subdivision incorporated with the starch. The water dispersible gums of course do not require a pregelatinizing treatment, as is the case with starch, and the gums in their commercial form, but preferably ground to a reasonable fineness such as 30 or 100 mesh, may be readily treated by the solvent method set forth herein.

In some cases, where starch is treated, it will be desirable to combine the processes of cooking and drying the starch with that of incorporating the chlorinated phenol. I have found that a convenient method for accomplishing this is to incorporate the chlorinated phenol in an extremely finely divided state in the water used for gelatinizing the starch, before the starch is added or after the starch has been added to the water, so as to form a starch slurry.

The best method of incorporating the phenol in the water is to dissolve it in a solvent which is not only capable of dissolving the phenol, but is also miscible with water, such as for example a lower aliphatic alcohol, such as isopropyl alcohol or the like. When this solution is added to the water with agitation, a finely divided, milky emulsion is formed. An emulsifying agent can be used, although it is not necessary to do so if sufficient agitation is provided when the solution of the phenol is added. Alternatively, the phenol can be melted and dispersed in the heated water, although this in general is much less convenient. The emulsion or dispersion of the phenol and water can be added to the starch slurry at any convenient point before it is actually put on to the drying rolls.

The starch slurry thus treated is dried on the rolls in the usual fashion, care being taken to achieve a temperature of the starch during drying of at least the melting point of the chlorinated phenol. If spray drying is used, instead of drying rolls, the same precaution is to be observed. In general, particle size of the phenol at the time of addition to the starch slurry to be dried should be less than about 5 microns. This insures a very fine and uniform coating of the starch; while raising the temperature, even if only momentarily, to higher than the melting point of the phenol insures complete fixation of the phenol on to the starch.

The same procedures can be used in the case of a gum. Many of the commercially available water-dispersible natural gums are prepared for use by dispersing in water and re-drying. This is the case, for example, with much of the locust bean gum, quince gum, and guar gum encountered in commerce. As indicated, the phenol can be added in the fashion just described, at or immediately before the drying step performed on the gum.

I have carried out a number of experiments and have found that the lowest ratio of chlorinated phenol to starch or gum which leads to a fermentation-resistant product is about 1% of the phenol by weight of starch or gum. In order to provide a reasonable safety factor, the best concentration that I have found is about 4 or 5%. A treated starch or gum is thus provided which is resistant to all of the manifold varieties of bacterial and fungal degradation occurring in the field use of drilling muds. I have carried out a number of additional experiments to see if any harm results from high concentrations of phenol, such as for example 10 percent. Such higher concentrations are harmless to standard mud properties, however, and it may be stated that economic considerations set the only top limit to the phenol concentration. In general, the phenols used in my invention cost five to ten times as much as the starch or gum. There is, accordingly, no need to exceed my preferred concentration.

A number of examples will now be given of the treatment of various materials with various phenols of the class which has hereinabove been defined and exemplified:

EXAMPLE I

A thin-boiling pre-gelatinized corn starch, obtained from a drilling mud materials manufacturer, was treated with a solution of 5-chloro-2-hydroxydiphenylmethane in isopropyl alcohol, so that 5% of the latter by weight of the starch was left on the starch after drying. A drilling mud was made up from 6% bentonite and tap water, and to separate portions of this mud there were added, respectively, untreated starch; starch treated with the phenol as has been described; and finally untreated starch with the same amount of the phenol being added directly to the mud containing the untreated starch by dissolving the phenol in isopropyl alcohol and dispersing the latter in the mud. The concentration of starch was the same in all cases, and was 6 lbs. per barrel. The muds were all inoculated with 3% by volume of a stock spoiled starch mud. The muds were tested for water loss at the outset of the experiment and were then incubated for two weeks at about 37° C., and the water loss determined again. Water loss tests were carried out in the manner prescribed by the American Petroleum Institute Code R.P. 29. The results were as follows:

Table I

| Additive to Mud | Initial Water Loss, cc. | Water Water Loss After 2 Weeks, cc. |
|---|---|---|
| A. Untreated starch | 5.6 | 12.5 |
| B. Starch treated with 5% 5-chloro-2-hydroxydiphenylmethane | 5.6 | 6.0 |
| C. Untreated starch, with same amount of phenol as used in B added separately to mud | 5.6 | 12.0 |

It will be seen from Example I that an amount of chlorinated phenol equal to 5% by weight of the starch, when placed on the starch by the solvent method described, was quite effective in preventing deterioration of the starch, while the same amount of the identical chlorinated phenol, present in the mud but not fixed on to the starch in accordance with my invention, failed completely to prevent degradation of the latter. The control test using starch with no preservative indicates the water loss obtained with complete fermentation; and this is almost identical to that obtained with the starch with the phenol added to the mud separately.

EXAMPLE II

In this series of tests, another drilling mud was prepared with bentonite, and the water loss was lowered by the addition of karaya gum, at a concentration of 3½ lbs. of gum per barrel of mud. In separate tests, untreated karaya gum was used, and karaya gum treated with a solution in isopropyl alcohol of 5-chloro-2-hydroxydiphenylmethane, by the solvent and evaporation process described, so that 5% of this phenol was fixed to the gum. The muds were then inoculated with 3% by volume of an actively fermenting starch mud taken from a drilling well, and water loss determined. The muds were incubated for two weeks as described in Example I, and retested. The results which follow show the excellent preservation of the karaya gum treated in accordance with my invention, and at the same time the spoilage occurring with the untreated gum, as manifested by the sharp increase in water loss:

Table II

| Additive to Mud | Initial Water Loss, cc. | Water Loss After 2 Weeks' Incubation, cc. |
|---|---|---|
| Karaya gum, no treatment | 4.6 | 10.0 |
| Karaya gum, treated with phenol as described | 5.0 | 5.6 |

EXAMPLE III

The test series described in Example II was carried out except that guar gum was used instead of karaya gum. All concentrations were the same. The guar gum used was not as effective a water-loss reducing agent at equal concentrations as the gum karaya, so that the initial water losses observed here were higher than in Example II. The test results clearly demonstrate, however, the spoilage which occurred in the case of the untreated guar gum and the perfect preservation which took place with the guar gum treated in accordance with the present invention.

Table III

| Additive to Mud | Initial Water Loss, cc. | Water Loss After 2 Weeks' Incubation, cc. |
|---|---|---|
| Guar gum, no treatment | 8.6 | 11.6 |
| Guar gum, treated with phenol as described | 9.6 | 9.5 |

EXAMPLE IV

In a commercial operation, in which corn starch is first given a thin-boiling treatment with hydrochloric acid and then neutralized with sodium carbonate, as is known to the art and as has been described, for example, on page 76 of the book by Ralph W. Kerr, entitled "Chemistry and Industry of Starch," Edition 2, New York, 1950, and the so-treated and neutralized starch is partially filtered so as to produce a slurry containing about 20% starch and 80% water, which is then fed to double-rotating steam-heated rolls maintained at a surface temperature of about 350° F., just prior to the feeding of the starch slurry to the rolls as described, an emulsion of 3-chloro-2-hydroxy-diphenyl, $C_{12}H_9OCl$, made in accordance with British Patent No. 396,251, is added with agitation. The emulsion is formed by dissolving one part of the phenol in five parts by weight of acetone, which is then added to 24 parts of water with high speed agitation using a motor driven propeller. The finely divided emulsion thus formed is added to the starch slurry in such a proportion that 4 lbs. of the phenol are added to each 100 lbs. of starch which is fed to the drier. The drier is operated in the usual fashion and as has been described, so that substantially all of the water is evaporated in the starch at the same time that it is cooked and dried, and the product contains the chlorinated phenol in proportions given in an exceedingly finely divided form fixed on to the starch. The final product is later used in treating the drilling fluid used in drilling a well.

EXAMPLE V

The process of Example IV is carried out except that waxy sorghum flour is used instead of corn starch, and 3-chloro-4-hydroxydiphenyl is used instead of the chlorinated phenol of Example IV.

EXAMPLE VI

A mixture of three parts by weight of pregelatinized thin-boiling potato starch and two parts of gum tragacanth are ground together in a hammer mill to a fineness of 100 mesh. 2'-chloro-2-hydroxyl-1,2-diphenylethane, ($\alpha$[2-chlorophenyl]-$\beta$[2-hydroxyphenyl]ethane), $$C_{14}H_{13}OCl$$

is dissolved in nine times its weight of a 50:50 mixture of methylethylketone and dichloromethane. Ten pounds of this solution are mixed with 25 lbs. of the starch-gum mixture described, and after about 10 minutes the mass is subjected to removal of the solvents by evaporation, leaving the starch-gum mixture with 4% by weight of the phenol intimately fixed thereto. The dried mass is sacked in bags for use in treating drilling muds.

EXAMPLE VII

The process of Example VI is carried out except that 6-chloro-3-hydroxydiphenyl is used instead of the substituted diphenylethane of Example VI.

EXAMPLE VIII

The process of Example IV is carried out as described therein, everything being the same except that 5-chloro-2-hydroxydiphenylmethane is used in place of the 3-chloro-2-hydroxydiphenyl recited in Example IV.

The starches and gums produced and treated in accordance with my invention are intended primarily for use in aqueous drilling muds, as described hereinabove. Where density substantially greater than water itself is not needed, for a particular drilling operation, a satisfactory drill fluid can be made with water and a starch or gum or mixture thereof produced in accordance with my invention. In other cases, the fluid will contain a burden of suspended matter, which may be clays, silts, or the like, incorporated into the fluid by drilling through sedimentary formations, or may be clays and bentonites deliberately added, as well as weighting materials such as barite where high density is desired. Oil may be emulsified into such a mud in the form of an oil-in-water emulsion, and in most cases the starch or gum itself will be a sufficient emulsifying agent therefor. In using my improved starches or gums in aqueous drilling fluids generally, from about 1 lb. to 25 lbs. of the treated starch or gum will be used per barrel of drilling fluid. Generally speaking, less than 1 lb. per barrel of the commonly used starches and gums produces an insignificant reduction in water loss; while more than about 25 lbs. per barrel may be economically wasteful and may lead to too thick a mud. The process of using my starches and gums in muds is to add them to the circulating fluid during the course of drilling so as to achieve and maintain a desired filter loss or water loss, generally less than obtained with the untreated mud, and not in so great amount as to render the mud unpumpable. The resistance of my treated starches and gums to fermentation renders unnecessary the addition of extraneous chemical preservatives to the mud.

It may be noted that the several substituted diphenyls described herein and recited in the claims are the following, in one system of nomenclature:

3-chloro 2-hydroxy diphenyl, -diphenylmethane, or -diphenylethane
4-chloro 2-hydroxy diphenyl, -diphenylmethane, or -diphenylethane
5-chloro 2-hydroxy diphenyl, -diphenylmethane, or -diphenylethane
6-chloro 2-hydroxy diphenyl, -diphenylmethane, or -diphenylethane
2'-chloro 2-hydroxy diphenyl, -diphenylmethane, or -diphenylethane
3'-chloro 2-hydroxy diphenyl, -diphenylmethane, or -diphenylethane
4'-chloro 2-hydroxy diphenyl, -diphenylmethane, or -diphenylethane
2-chloro 3-hydroxy diphenyl, -diphenylmethane, or -diphenylethane
4-chloro 3-hydroxy diphenyl, -diphenylmethane, or -diphenylethane
5-chloro 3-hydroxy diphenyl, -diphenylmethane, or -diphenylethane
6-chloro 3-hydroxy diphenyl, -diphenylmethane, or -diphenylethane
2'-chloro 3-hydroxy diphenyl, -diphenylmethane, or -diphenylethane
3'-chloro 3-hydroxy diphenyl, -diphenylmethane, or -diphenylethane
4'-chloro 3-hydroxy diphenyl, -diphenylmethane, or -diphenylethane
2-chloro 4-hydroxy diphenyl, -diphenylmethane, or -diphenylethane
3-chloro 4-hydroxy diphenyl, -diphenylmethane, or -diphenylethane
2'-chloro 4-hydroxy diphenyl, -diphenylmethane, or -diphenylethane
3'-chloro 4-hydroxy diphenyl, -diphenylmethane, or -diphenylethane
4'-chloro 4-hydroxy diphenyl, -diphenylmethane, or -diphenylethane It will be understood that my invention is a broad one and numerous modifications, substitutions, and other changes may be made within the broad scope thereof, and that of the claims which follow.

Having described the invention, what I claim is:

1. The process of treating organic colloids of the starch-gum type comprising intimately coating a comminuted material chosen from the class consisting of water dispersible gums and water dispersible starches with a chlorinated hydroxydiphenyl having the formula $C_{12}H_9OCl(CH_2)_n$, where $n$ is a digit from 0 to 2 inclusive.

2. The process of claim 1 wherein the material is starch.

3. The process of claim 1 wherein the chlorinated hydroxydiphenyl is 5-chloro-2-hydroxidiphenylmethane.

4. The process of treating organic colloids of the starch-gum type comprising wetting a comminuted material chosen from the class consisting of water dispersible starches and water dispersible gums with a solution of a chlorinated hydroxydiphenyl having the formula $C_{12}H_9OCl(CH_2)_n$, where $n$ is a digit from 0 to 2 inclusive, in an organic solvent therefor and thereafter removing said organic solvent by evaporation so as to leave said chlorinated hydroxydiphenyl in intimate contact with said material.

5. The process of claim 4 wherein the material is starch.

6. The process of claim 4 wherein the chlorinated hydroxydiphenyl is 5-chloro-2-hydroxydiphenylmethane.

7. The process of treating organic colloids of the starch-gum type comprising contacting a comminuted material chosen from the class consisting of water dispersible starches and water dispersible gums with an aqueous dispersion of a chlorinated hydroxydiphenyl having the formula $C_{12}H_9OCl(CH_2)_n$, where $n$ is a digit from 0 to 2 inclusive, in water having the particles of said diphenyl in said dispersion of less than about 5 microns, bringing said mixture thus formed to a temperature in excess of the melting point of said chlorinated hydroxydiphenyl allowing said water to evaporate so as to leave said chlorinated hydroxydiphenyl with said material.

8. The process of claim 7 wherein the material is starch.

9. The process of claim 7 wherein the chlorinated hydroxydiphenyl is 5-chloro-2-hydroxydiphenylmethane.

10. A fermentation-resistant organic colloid of the starch-gum type for use in drilling muds comprising a comminuted material chosen from the class consisting of water dispersible starches and water dispersible gums intimately coated with a chlorinated hydroxydiphenyl having the formula $C_{12}H_9OCl(CH_2)_n$, where $n$ is a digit from 0 to 2 inclusive.

11. The composition of claim 10 wherein the material is starch.

12. The composition of claim 10 wherein the chlorinated hydroxydiphenyl is 5-chloro-2-hydroxydiphenylmethane.

References Cited in the file of this patent

UNITED STATES PATENTS

| | | |
|---|---|---|
| 2,052,320 | Sjostrom | Aug. 25, 1936 |
| 2,116,867 | Kreimeier et al. | May 10, 1938 |
| 2,147,104 | Moller et al. | Feb. 14, 1939 |
| 2,209,591 | Barnes | July 30, 1940 |
| 2,417,307 | Larsen | Mar. 11, 1947 |
| 2,600,404 | Hoeppel | June 17, 1952 |

OTHER REFERENCES

Chem. Abstracts, January–March, 1934, vol. 28, p. 578 (top 2d col.).